(12) United States Patent
Uemura et al.

(10) Patent No.: US 7,271,517 B2
(45) Date of Patent: Sep. 18, 2007

(54) THREE-PHASE ALTERNATING CURRENT GENERATOR

(75) Inventors: Fumito Uemura, Tokyo (JP); Shinji Baba, Tokyo (JP); Hirohisa Yokota, Tokyo (JP)

(73) Assignee: Mitsubishi Denki Kabushika Kaisha, Tokyo (JP)

( * ) Notice: Subject to any disclaimer, the term of this patent is extended or adjusted under 35 U.S.C. 154(b) by 0 days.

(21) Appl. No.: 10/429,853

(22) Filed: May 6, 2003

(65) Prior Publication Data

US 2004/0090136 A1    May 13, 2004

(30) Foreign Application Priority Data

Nov. 12, 2002   (JP)   ............................. 2002-328661

(51) Int. Cl.
*H02K 21/22*   (2006.01)
(52) U.S. Cl. ................................. 310/153; 310/156.26
(58) Field of Classification Search .......... 310/156.45, 310/156.12, 156.01, 156.38, 254
See application file for complete search history.

(56) References Cited

U.S. PATENT DOCUMENTS

| | | | | |
|---|---|---|---|---|
| 3,663,850 A | * | 5/1972 | Phelon | 310/153 |
| 4,491,769 A | * | 1/1985 | Heidelberg | 310/156.26 |
| 5,017,822 A | * | 5/1991 | Shimizu et al. | 310/207 |
| 5,030,864 A | * | 7/1991 | Van Hout et al. | 310/67 R |
| 5,212,419 A | * | 5/1993 | Fisher et al. | 310/254 |
| 5,554,902 A | * | 9/1996 | Kessens et al. | 310/156.12 |
| 5,606,208 A | * | 2/1997 | Sakashita et al. | 310/71 |
| 5,689,147 A | * | 11/1997 | Kaneda et al. | 310/156.05 |
| 5,939,849 A | * | 8/1999 | Ushikoshi | 318/254 |
| 5,962,939 A | * | 10/1999 | Nakamura et al. | 310/70 A |
| 6,081,058 A | * | 6/2000 | Suzuki et al. | 310/156.45 |
| 6,313,558 B1 | * | 11/2001 | Abukawa et al. | 310/254 |
| 6,583,530 B2 | * | 6/2003 | Hsu | 310/254 |
| 6,700,276 B2 | * | 3/2004 | Hakamata | 310/179 |
| 6,703,753 B1 | * | 3/2004 | Fujinaka | 310/216 |
| 2002/0145354 A1 | * | 10/2002 | Hakamata | 310/179 |

FOREIGN PATENT DOCUMENTS

| | | | |
|---|---|---|---|
| JP | 61039842 A | * | 2/1986 |
| JP | 01074052 A | * | 3/1989 |
| JP | 02254950 A | * | 10/1990 |
| JP | 5-284702 | | 10/1993 |
| JP | 2001-112226 | | 4/2001 |
| JP | 2003-348784 A | | 12/2003 |
| JP | 2004-088954 A | | 3/2004 |
| JP | 2004-088955 A | | 3/2004 |

OTHER PUBLICATIONS

Kokichi Okawa, "Design and Characteristic Computation Method for a Permanent Magnet Magnetic Circuit (II), Usage Volume", Sougou Denshi Research, Sep. 30, 1997, First Edition, pp. 479-481.

* cited by examiner

*Primary Examiner*—Burton Mullins
(74) *Attorney, Agent, or Firm*—Sughrue Mion Pllc.

(57) ABSTRACT

A three-phase alternating current generator includes a bowl-shaped flywheel, sixteen permanent magnets provided on an inner circumferential surface of the flywheel, and a stator located in the flywheel. Further, The stator is composed of twelve teeth provided opposite to the permanent magnets and of coils each being continuously wound around every three teeth among the teeth for generating electric power by an electromagnetic induction effect with the magnets.

2 Claims, 4 Drawing Sheets

⊗ : START OF WINDING    THE NUMBER OF MAGNETS :16
⊙ : END OF WINDING       THE NUMBER OF TEETH :12

⊗ : START OF WINDING
⦿ : END OF WINDING

THE NUMBER OF MAGNETS :16
THE NUMBER OF TEETH :12

$$Iu' = \frac{Iu}{\sqrt{3}}$$

THREE-PHASE ALTERNATING CURRENT GENERATOR

BACKGROUND OF THE INVENTION

1. Field of the Invention

The present invention relates to a three-phase alternating current generator (three-phase magnet generator) driven by an internal combustion engine.

2. Description of the Related Art

With respect to the principle of an alternating current generator, a flywheel to which permanent magnets are fixed is rotated by the power of an internal combustion engine, and rotating magnetic fields produced by the permanent magnets cut across a stator coil (generator coil), with the result that a voltage is induced in the stator coil by an electromagnetic induction effect. In this case, the magnets are fixed in a rotation direction of the flywheel and N-poles and S-poles are arranged at regular intervals. Thus, the number of magnets to be used becomes 2n (n is a positive integer (natural number)). In addition, the number of teeth of the stator coil becomes 3m (m is a positive integer (natural number)) because of a three-phase alternating current generator.

A conventional three-phase alternating current generator has a structure of n=m. In other words, when the number of magnets fixed to the flywheel is set to 2n, the number of teeth of the stator coil becomes 3n. A Y-connection is employed as a connection method for three-phase output (for example, Kokichi Okawa, "Design and Characteristic Computation Method for a Permanent Magnet Magnetic Circuit (II), Usage Volume," Sougou Denshi Research, Sep. 30, 1987, First Edition, pp.479-481).

According to the conventional three-phase alternating current generator, when the number of magnets is 2n, the number of teeth is 3n, and a three-phase output is a Y-connection, it is possible to satisfy an output specification characteristic. However, a self-heating amount becomes very high. One of factors in which the self-heating amount becomes higher is the Y-connection.

In general, the Y-connection or the Δ-connection is employed as a connection method on the output side of the three-phase alternating current generator driven by an internal combustion engine. An output current in the Y-connection becomes (line current Iu=phase current Iu') as shown in FIG. 5. An output current in the Δ-connection becomes (line current Iu/$\sqrt{3}$=phase current Iu') as shown in FIG. 6.

Therefore, a current value required for one phase in the Y-connection becomes about $\sqrt{3}$ times higher than that in the Δ-connection. Here, the self-heating amount is computed from $I^2R$. Symbol I denotes a phase current and R denotes a winding resistance. The self-heating amount becomes the square of the current value. Thus, the self-heating amount in the Y-connection becomes higher than that in the Δ-connection, so that it is ideal to employ the Δ-connection with respect to measures for suppressing the self-heating amount. However, in the case of the Δ-connection, the output current at a low speed rotation is reduced. Accordingly, because it is impossible to satisfy the specification, there is a problem that it is difficult to apply the Δ-connection to the conventional three-phase alternating current generator.

SUMMARY OF THE INVENTION

The present invention has been made to solve the above-mentioned problem. An object of the present invention is to obtain a three-phase alternating current generator capable of greatly reducing a self-heating amount to achieve a reduction in size and an increase in output.

A three-phase alternating current generator according to the present invention includes: a bowl-shaped flywheel; 4n (n is a natural number) magnets provided on an inner circumferential surface of the flywheel; and a stator located in the flywheel, in which the stator includes: 3n teeth provided opposite to the magnets; and a plurality of coils which each are continuously wound around every three teeth among the teeth and generate electric power by an electromagnetic induction effect with the magnets.

Therefore, when the number of magnets is set to 4n and the number of teeth is set to 3n, an effect in which the coil temperature (self-heating amount) is greatly reduced, thereby achieving a reduction in size and an increase in output, is obtained.

DETAILED DESCRIPTION OF THE PREFERRED EMBODIMENT

Embodiment 1

Figure 1:
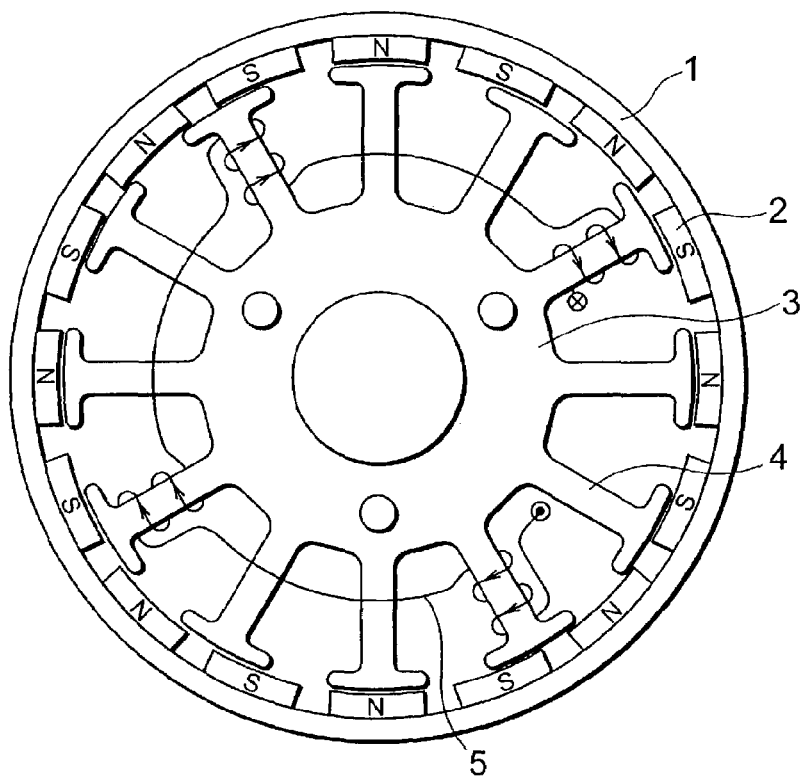
FIG. 1 shows a structure of a three-phase alternating current generator according to Embodiment 1 of the present invention.

A three-phase alternating current generator according to Embodiment 1 of the present invention will be described with reference to the drawing. FIG. 1 shows a structure of a three-phase alternating current generator according to Embodiment 1 of the present invention.

The three-phase alternating current generator according to Embodiment 1 of the present invention is characterized in that a generator coil is composed of 4n magnets and 3n teeth. When n=4, the number of magnets becomes 16 and the number of teeth of a stator coil becomes 12. A connection of a generator output side is a Δ-connection and it is necessary to increase the amount of magnet to be used as compared with a conventional example.

FIG. 1 shows the structure of the three-phase alternating current generator in the case where a structure of n=4 is used.

In FIG. 1, a flywheel 1 is a bowl-shaped rotor. The number of permanent magnets 2 is 16 and they are provided on the inner circumferential surface of the flywheel 1. The permanent magnets 2 each are a rare-earth magnet or a ferrite magnet.

Also, in the same figure, a stator 3 has twelve teeth 4. One phase is composed of four teeth, thereby achieving a three-phase alternating current circuit (U, V, and W phases). A Δ-connection is employed as a connection method for three-phase output. In addition, the stator 3 is composed of a stator core (iron core) in which thin plates made from a rolled steel plate or a silicon steel plate are laminated and coils (windings) 5.

Further, in the same figure, the coils 5 are wound around the teeth 4 of the stator core. The coil 5 for each phase is continuously wound around every third tooth 4. Crossover portions between every third tooth extend over the same axial side of the stator. Each winding direction is the same direction. Electric power is generated by an electromagnetic induction effect with the magnets 2.

Next, operating characteristics of the three-phase alternating current generator according to Embodiment 1 will be described with reference to the drawings.

Figure 2:
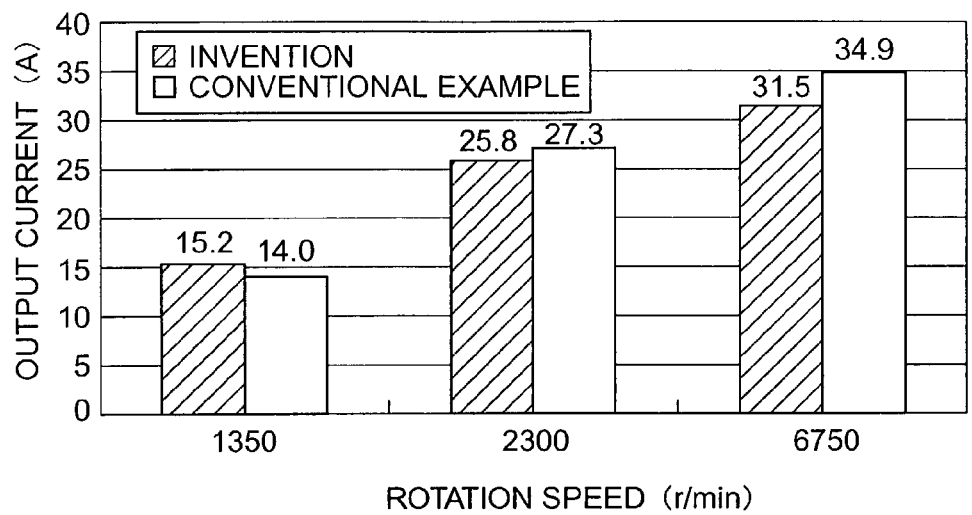
FIG. 2 shows an output current characteristic of the three-phase alternating current generator according to Embodiment 1 of the present invention and that of a conventional example.

FIG. 2 shows an output current characteristic of the three-phase alternating current generator according to Embodiment 1 of the present invention and that of a conventional example. In addition, FIG. 3 shows a structure of an output current measuring circuit for measuring an output current of the three-phase alternating current generator according to Embodiment 1 of the present invention.

Figure 3:
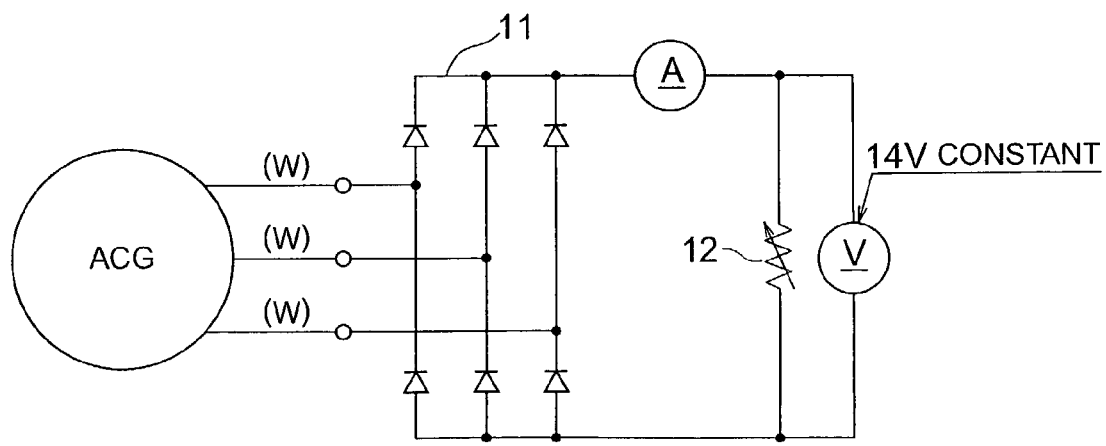
FIG. 3 shows an output current measuring circuit for measuring an output current of the three-phase alternating current generator according to Embodiment 1 of the present invention.

In FIG. 3, the output current measuring circuit is constructed by connecting a rectifying circuit 11 and a load 12 with the three-phase alternating current generator (ACG).

When a voltage of the load 12 is constantly kept to 14 V, the output current measured by the output current measuring circuit is a value obtained by measuring a current flowing into the load 12.

As shown in FIG. 2, the output currents are values measured when the rotation speeds of the three-phase alternating current generator are 1350 (r/min), 2300 (r/min), and 6750 (r/min). With respect to Embodiment 1 (present invention) and the conventional example, substantially the same characteristic is obtained.

Figure 4:
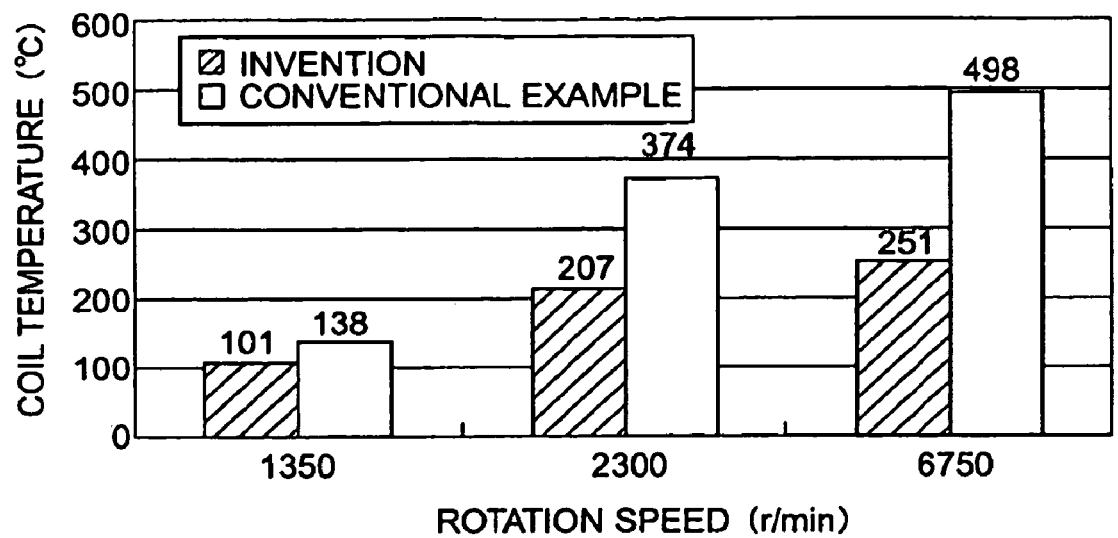
FIG. 4 shows a coil temperature characteristic of the three-phase alternating current generator according to Embodiment 1 of the present invention and that of the conventional example.
Figure 5:
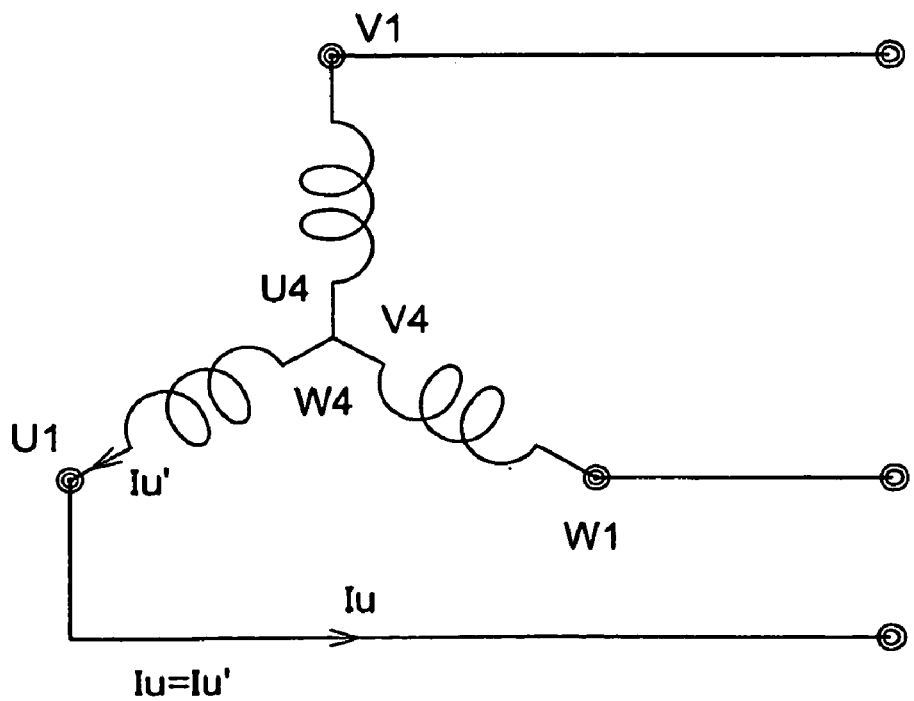
FIG. 5 shows a Y-connection.
Figure 6:
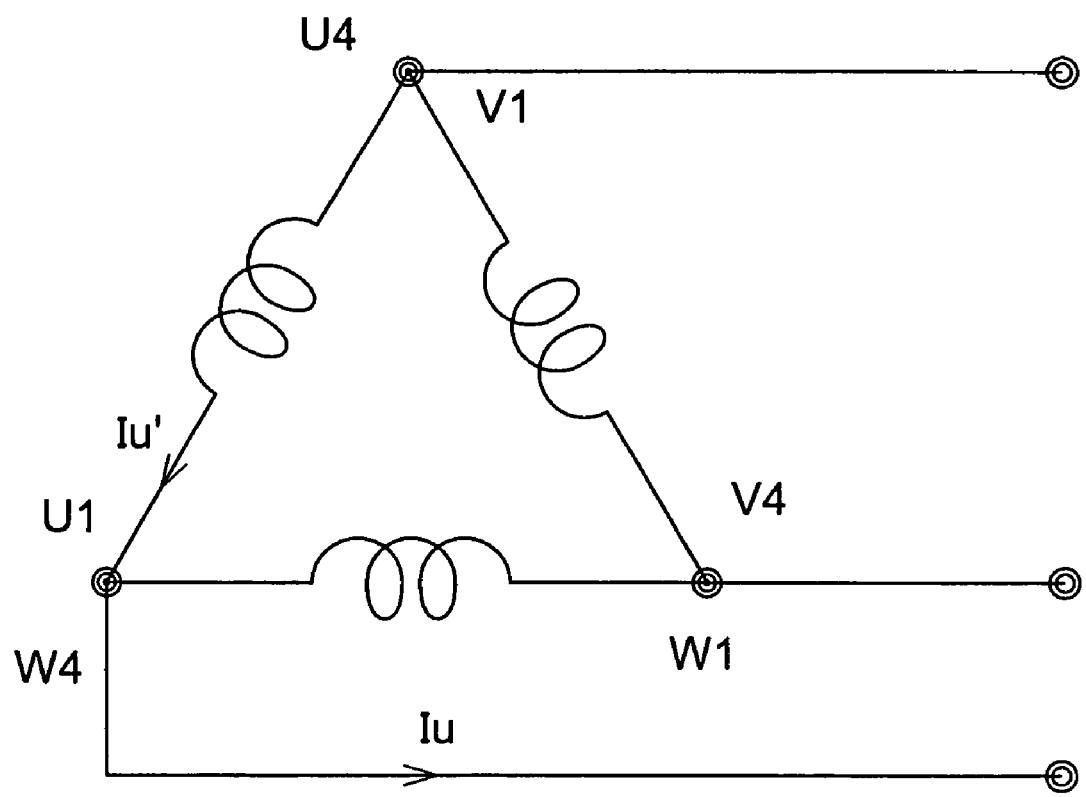
FIG. 6 shows a Δ-connection.

FIG. 4 shows a coil temperature (self-heating amount) characteristic of the three-phase alternating current generator according to Embodiment 1 of the present invention and that of the conventional example.

More specifically, FIG. 4 shows peak coil temperatures when the respective rotation speeds of the three-phase alternating current generator are 1350 (r/min), 2300 (r/min), and 6750 (r/min). Results measured in air as a measurement condition are indicated.

In Embodiment 1 (present invention), as shown in FIG. 4, it can be recognized that the coil temperature (self-heating amount) is greatly reduced as compared with the conventional example. When the rotation speed is 1350 (r/min), a coil temperature (self-heating amount) reduction effect of 37° C. is obtained. When the rotation speed is 2300 (r/min), a coil temperature (self-heating amount) reduction effect of 167° C. is obtained. When the rotation speed is 6750 (r/min), a coil temperature (self-heating amount) reduction effect of 247° C. is obtained.

In other words, in the three-phase alternating current generator according to Embodiment 1 of the present invention, not a Y-connection but the Δ-connection is employed as the connection of three-phase output side. This is an essential condition for reducing a phase current to suppress the self-heating amount as described above. When the Δ-connection is applied to the structure of the conventional example in which the number of magnets is 2n and the number of teeth is 3n, an output in a low-rotation speed region is greatly reduced. Thus, the Δ-connection is applied to the structure of the present invention. The number of magnets is twice that of the structure of the conventional example, so that a frequency becomes twice as high as the frequency of the structure of the conventional example. According to such an effect, the output in the low-rotation speed region is increased and a peak current in a high-rotation speed region can be reduced. With respect to the amount of magnets to be used, when substantially the same output characteristic as the structure of the conventional example is required, the amount of magnets to be used in the structure of the present invention is increased as compared with that in the structure of the conventional example.

When the structure of Embodiment 1 (present invention) is applied to the three-phase alternating current generator, the coil temperature (self-heating amount) is greatly reduced, so that a reduction in size and an increase in output are made possible.

What is claimed is:

1. A three-phase alternating current generator comprising:
 a bowl-shaped flywheel;
 4n magnets spaced at equal intervals on an inner circumferential surface of the flywheel, where n is a natural number, each of the 4n magnets being separated from adjacent ones of the 4n magnets by gaps on each side thereof in a circumferential direction; and
 a stator, located in the flywheel, comprising: 3n teeth provided opposite to the magnets; and three coils, each of which are continuously wound around every third tooth among the 3n teeth in a same winding direction and generate electric power by an electromagnetic induction effect with the 4n magnets,
 wherein each of the magnets is a permanent magnet made from one of a rare-earth magnet and a ferrite magnet,
 wherein the stator has a core made from one of a rolled steel plate and a silicon steel plate,
 wherein a Δ-connection is employed as a connection method for the three-phase output,
 wherein all crossovers between teeth of each of the coils extend over the same axial side of the stator,
 wherein the crossovers are arranged along a radially inner portion of the stator, and
 wherein a width in a circumferential direction of each magnet side end of the 3n teeth is wider than a width in a circumferential direction of each gap, and is substantially equal to a width in a circumferential direction of each magnet.

2. A three-phase alternating current generator according to claim 1, wherein the number of magnets is 16 and the number of teeth is 12.

* * * * *